United States Patent
Weigand

(10) Patent No.: US 8,474,859 B2
(45) Date of Patent: Jul. 2, 2013

(54) AIRBAG ARRANGEMENT FOR VEHICLE OCCUPANT RESTRAINT SYSTEM

(75) Inventor: Steffen Weigand, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/588,486

(22) Filed: Aug. 17, 2012

(65) Prior Publication Data

US 2012/0319384 A1    Dec. 20, 2012

Related U.S. Application Data

(63) Continuation of application No. PCT/EP2011/058021, filed on May 18, 2011.

(30) Foreign Application Priority Data

May 18, 2010 (DE) .................. 10 2010 029 087

(51) Int. Cl.
*B60R 21/20* (2011.01)
*B60R 21/203* (2006.01)

(52) U.S. Cl.
USPC ....................... 280/728.2; 280/731

(58) Field of Classification Search
USPC .............. 280/728.2, 728.3, 731, 732; 24/297; 403/329, DIG. 14; 411/512
See application file for complete search history.

(56) References Cited

U.S. PATENT DOCUMENTS

| | | | | |
|---|---|---|---|---|
| 5,348,549 A * | 9/1994 | Brown et al. | ................. | 604/403 |
| 5,354,093 A * | 10/1994 | Schenck et al. | ............ | 280/728.3 |
| 5,577,768 A | 11/1996 | Taguchi et al. | | |
| 5,658,008 A | 8/1997 | Herrmann et al. | | |
| 6,062,592 A | 5/2000 | Sakurai et al. | | |
| 6,079,737 A | 6/2000 | Isomura et al. | | |
| 6,161,863 A | 12/2000 | Fujita et al. | | |
| 6,318,585 B1 * | 11/2001 | Asagiri et al. | ................ | 220/788 |
| 7,052,036 B2 * | 5/2006 | Lee et al. | ................... | 280/728.3 |
| 7,641,222 B2 * | 1/2010 | Schramm | ................... | 280/728.3 |
| 7,644,949 B2 * | 1/2010 | Eckert et al. | ............... | 280/728.2 |
| 8,267,422 B2 * | 9/2012 | Sauer et al. | ................ | 280/728.3 |
| 2002/0149179 A1 | 10/2002 | Holtz | | |
| 2003/0038460 A1 | 2/2003 | Sczeburek et al. | | |
| 2007/0267850 A1 * | 11/2007 | Eckert et al. | ............... | 280/728.2 |
| 2008/0100039 A1 * | 5/2008 | Schramm | ................... | 280/728.2 |
| 2012/0032424 A1 * | 2/2012 | Weigand et al. | ........... | 280/728.2 |

FOREIGN PATENT DOCUMENTS

| | | |
|---|---|---|
| DE | 44 14 743 A1 | 11/1994 |
| DE | 44 25 495 A1 | 1/1996 |
| DE | 201 13 806 U1 | 4/2002 |
| DE | 10 2007 023 075 A1 | 11/2008 |
| EP | 0 887 239 A2 | 12/1998 |
| EP | 0 895 904 A2 | 2/1999 |
| GB | 2 339 408 A | 1/2000 |

OTHER PUBLICATIONS

PCT International Search Report in PCT/EP2011/058021 dated Oct. 7, 2011.

* cited by examiner

*Primary Examiner* — Joseph Rocca
(74) *Attorney, Agent, or Firm* — Foley & Lardner LLP

(57) ABSTRACT

An airbag arrangement for a vehicle occupant restraint system is provided. The airbag arrangement comprising airbag inflatable for protecting a vehicle occupant, a gas generator for inflating the airbag, a gas generator carrier at which the gas generator is arranged, a housing part which—with regard to the state of the airbag arrangement installed in the vehicle—covers the airbag towards the vehicle interior. The housing part comprises at least one latching element and the gas generator carrier comprises at least one latching opening assigned to the latching element. The housing part can be connected to the gas generator carrier by inserting the latching element into the latching opening along an insertion direction up to a latching position. The latching element reaches behind a blocking element adjacent the latching opening and connected to the gas generator carrier such that pulling the latching element out of the latching opening is counteracted.

14 Claims, 5 Drawing Sheets

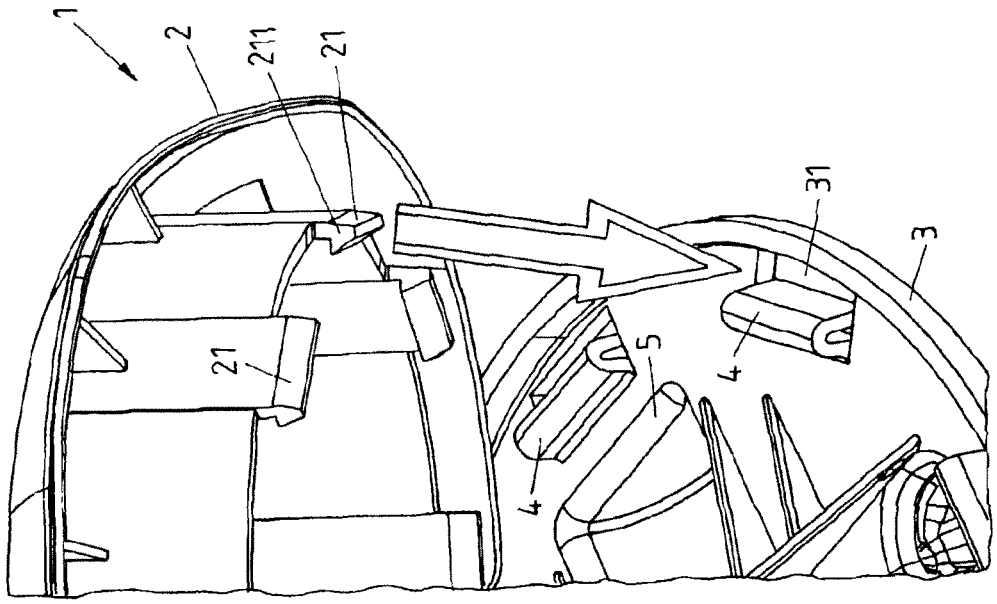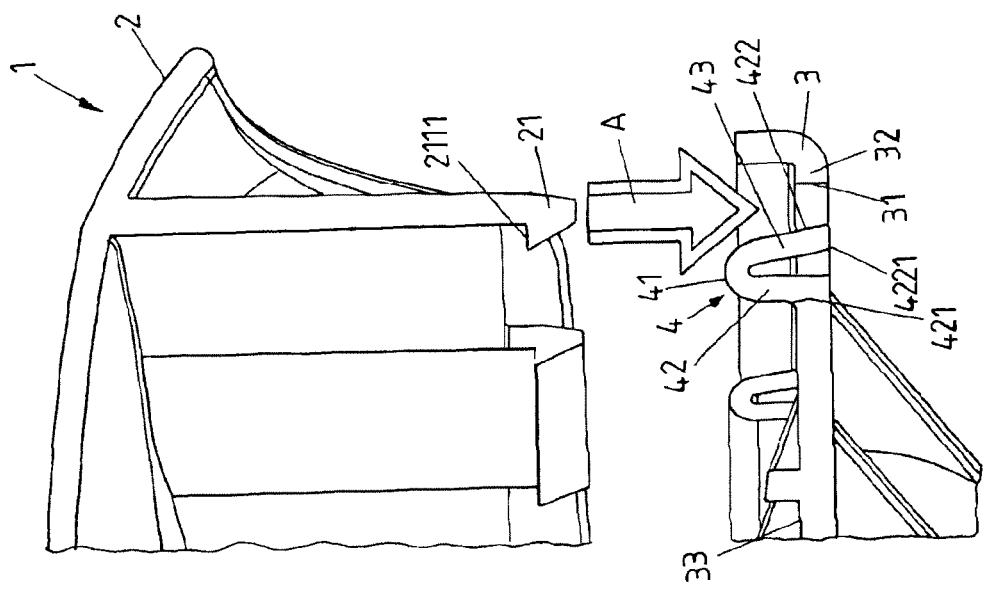

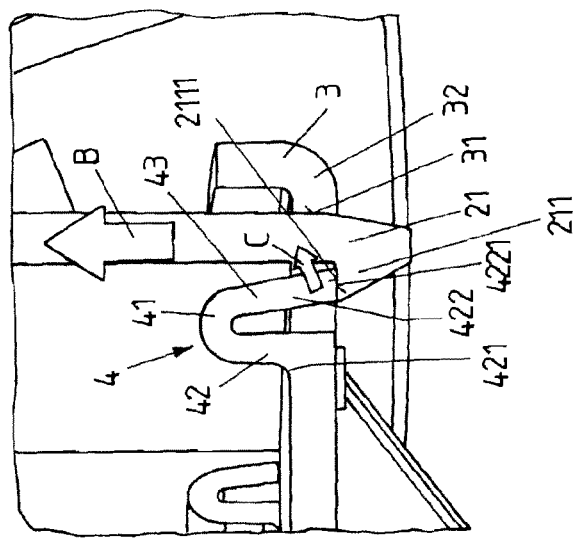
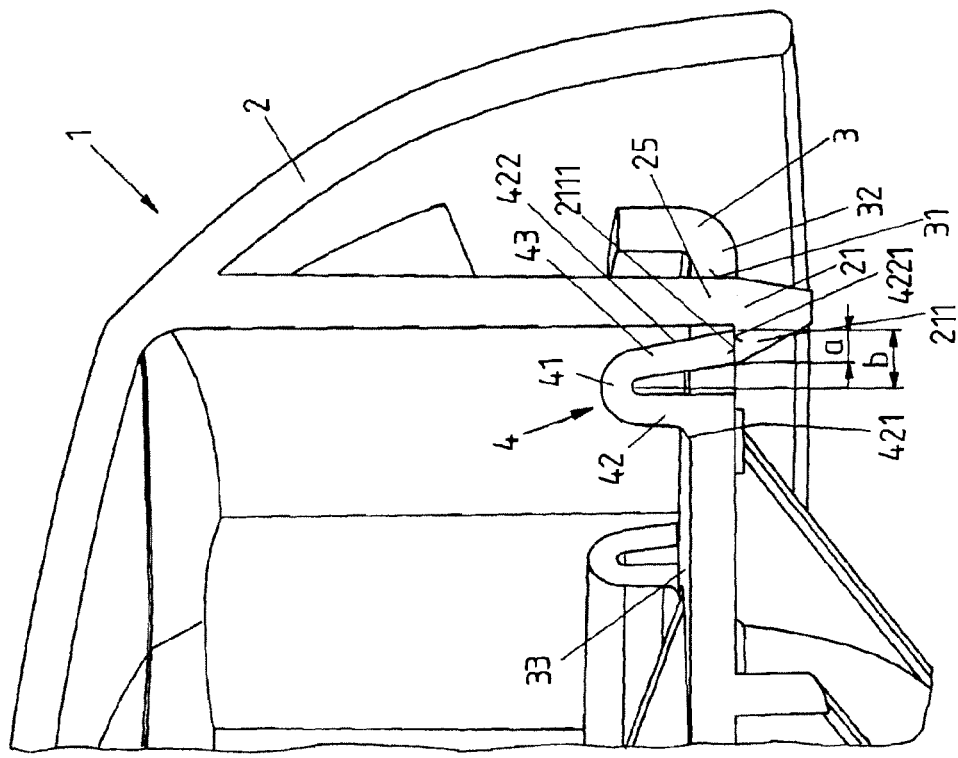

AIRBAG ARRANGEMENT FOR VEHICLE OCCUPANT RESTRAINT SYSTEM

CROSS-REFERENCE TO A RELATED APPLICATION

This application is a continuation of International Patent Application Number PCT/EP2011/058021, filed on May 18, 2011, which was published in German as WO 2011/144648. The foregoing international application is incorporated by reference herein.

BACKGROUND

The invention relates to an airbag arrangement for a vehicle occupant restraint system.

Airbag arrangement arrangements comprising an inflatable airbag and a gas generator arranged at a gas generator carrier for inflating the airbag are know from the prior art. The airbag is covered by means of a housing part (in particular in the form of an airbag cap) at least at a side facing towards the vehicle interior, wherein the airbag cap is connected to the gas generator carrier.

SUMMARY

The problem to be solved by the invention is to provide an airbag arrangement permitting to realize a stable connection between the housing part and a gas generator carrier and which nevertheless requires little space.

According to an exemplary embodiment of the invention an airbag arrangement for a vehicle occupant restraint system is provided, comprising
 an airbag inflatable for protecting a vehicle occupant;
 a gas generator for inflating the airbag;
 a gas generator carrier at which the gas generator is arranged;
 a housing part which—with regard to the state of the airbag arrangement installed in the vehicle—covers the airbag towards the vehicle interior, wherein
 the housing part comprises at least one latching element and the gas generator carrier comprises at least one latching opening assigned to the latching element,
 the housing part can be connected to the gas generator carrier by inserting the latching element into the latching opening along an insertion direction up to a latching position, where the latching element reaches behind a blocking element adjacent the latching opening and connected to the gas generator carrier such that pulling the latching element out of the latching opening is counteracted,
 the blocking element is configured in such a way that it at least in sections presses against the latching element in a direction running obliquely or transversely to the insertion direction when a tensile force opposite the insertion direction is exerted on the latching element in latching position, and
 the blocking element comprises a first and a second subsection, wherein the first subsection is connected to the gas generator carrier and via a curvature to the second subsection such that the blocking element is designed at least approximately U- or V-shaped in cross section.

The blocking element thus in particular is configured in such a way that it presses against the latching element if it is attempted to remove the locked housing part from the gas generator carrier such that the blocking element is blocked by the latching element, and for example, a deformation (e.g. bending) of the blocking element is prevented. In particular, a tensile force exerted on the latching element during an attempt to remove the housing part is deflected at least partially towards the latching element by the blocking element in such a way that it is held by the latching element itself. In other words, a self-locking latching connection of the housing part on the gas generator carrier is realized.

The blocking element also is designed flexible in such a way that it will be at least in section pushed aside during insertion of the latching element into the latching opening such that the diameter of the latching opening increases and in particular a latching portion of the latching element whose dimensions are larger than the dimensions of the latching opening in the initial state can be inserted through the latching opening. After insertion of the broader latching portion of the latching element, the blocking element returns to its original position such that the latching portion of the latching element engages behind the blocking element.

The gas generator carrier, in particular, is configured in such a way that it extends along a main extension plane, i.e. it has its largest extension along a plane. It is, of course, conceivable that the gas generator carrier comprises structures protruding away from the main extension plane, i.e. the gas generator carrier may, of course, have a certain extension perpendicular to its main extension plane. For example, the gas generator carrier comprises a side wall extending along its outer circumference.

The latching opening (or the multiple latching openings) according to an example of the invention is not arranged in a side wall area orientated perpendicular to the main extension plane but in a portion of the gas generator carrier extending parallel to the main extension plane such that the insertion direction, along which the latching element (or the multiple latching elements) of the housing part is to be inserted into the latching opening, at least approximately extends perpendicular to the main extension plane of the gas generator carrier. The possibility to arrange the latching connection not in a side wall of the gas generator carrier but in an area orientated parallel to the main extension plane permits, for example, the elements (latching elements, blocking elements, latching opening) of the latching connection to have relatively low space requirements.

In particular, if a plurality of latching openings is provided, these can be arranged in a common plane.

It is, of course, also possible that the latching opening (or at least some latching openings) is arranged in a structure orientated obliquely or perpendicular to the main extension plane of the gas generator (e.g. a wall protruding from a bottom area of the gas generator carrier or a side wall) such that the insertion direction points obliquely or parallel to the main extension plane of the gas generator carrier.

Further more, the gas generator carrier may comprise structures, for example, an opening, for arranging the gas generator at the gas generator carrier. For example, the gas generator carrier comprises a longitudinal bulging in which a tube gas generator can be arranged. It is, however, also conceivable that the gas generator is configured to receive a pot gas generator and for this, for example, comprises an, especially circular (for example central), opening.

The airbag arrangement according to the invention can, in particular, be used in a driver airbag module. Accordingly, the invention also relates to a driver airbag module comprising the airbag arrangement described above.

The housing part, in particular, is designed in the form of an airbag cap which covers the airbag with a dome-like (hollow hemisphere-like) bulge, wherein the bulge faces away from the gas generator carrier and wherein a front side of the airbag cap faces towards the gas generator carrier or bears against it when the airbag cap is locked to the gas generator carrier.

If multiple latching openings are arranged in the gas generator carrier, they are, for example, arranged along an outer circumference of the gas generator carrier, wherein, for example, at least some of the latching openings have a constant distance from one another. Accordingly, multiple latching elements are provided at the housing part. The latching openings, for example, have a rectangular cross section, wherein, in particular, they are orientated in such a way that the long sides extend along the circumferential direction.

The latching opening, in particular, is limited by a rim formed by the gas generator carrier and the blocking element. Especially, a surface of the blocking element extending obliquely to the gas generator carrier (i.e. to its main extension plane) limits the latching opening.

According to an example, which is not part of the invention, the blocking element, for example, extends at least in sections at an angle to the gas generator carrier, i.e. the blocking element is angled with respect to the main extension plane of the gas generator carrier in such a way that extends towards the latching elements in the latching position and not away from the latching element (see FIG. 1B).

Exemplarily, the blocking element in such a design, which is not part of the invention, does not comprise a curvature connecting two sections of the blocking element, but rather is connected to the gas generator carrier via a curvature, only. More particularly, the blocking element is bent away from the gas generator carrier in such a way that during an attempt to pull the latching element out of the latching opening, the latching element presses against a portion of the blocking element so that the blocking element experiences a torque around a point in the region of the curvature. Thereby, it is pivoted (bent) towards the latching element until it bears against another portion of the latching element such that the pivot movement of the blocking element is blocked. Therefore, a withdrawal of the latching element from the latching opening is prevented or at least counteracted.

According to another non-inventive example, the blocking element can be bent away from a side of a gas generator carrier to be turned towards the housing part and can be exclusively turned away in a direction facing away from the housing part. In particular, according to this variant, the blocking element is located mainly or completely on a side of a gas generator carrier that is to be turned away from the housing part, which in the assembled state of the gas bag arrangement faces away from the airbag. For example, the blocking element comprises a front side extending at least approximately parallel to the gas generator carrier, wherein the latching element in its latching position bears against the front side or will be brought into contact with the front side of the blocking element when a tensile force opposite the insertion direction is exerted on the latching element.

Thereby, the blocking element, as described above, is moved towards the latching element in a direction perpendicular or inclined to the insertion direction until it presses against a section of the latching element different from the portion bearing against the front side or, if it already bears against this section before exerting the tensile force, presses stronger against this section of the latching element. The force induced into the blocking element via the latching element, is thus at least partially held by a section of the latching element. In this case, for example, a rim section of the latching opening can bear against the latching element and can provide a counter-bearing for the latching element. For example, this "counter-bearing" rim section of the latching opening is arranged opposite to a rim section of the latching opening that is formed by the blocking element and that under tensile load on the latching element presses against the latching element.

According to an exemplary embodiment of the invention, the blocking element comprises a first and a second subsection, wherein the first subsection is connected to the gas generator carrier. The first and the second subsection are connected to one another via a curvature. According to an embodiment of the invention, the blocking element thus has an essentially U- or V-like shaped cross-section. The blocking element thus comprises exactly one curvature, which connects the two subsections of the blocking element to one another. In this case, the curvature of the U forms the curvature by which the first subsection (the arms of the "U") of the blocking element is connected to the second subsection.

In particular, the curvature via which the first and the second subsection are connected to one another is located on a side of the gas generator carrier that is to be turned towards the housing part. However, the second subsection, for example, comprises a front side that at least approximately extends parallel to the gas generator carrier (i.e. its main extension plane) against which the latching element in its latching position or at least when a tensile force is exerted on the latching element bears against.

Exemplarily, the front side of the second section of the blocking element is positioned in such a way that it is aligned with a side of the gas generator carrier that is to be turned towards the housing part, i.e. it approximately is located in a plane together with this side of the gas generator carrier. It is, however, also conceivable that the second section of the blocking element is configured in such a way that the front side, which the latching element in latching position or under tensile force bears against, is not positioned in the plane of the side of the gas generator carrier that is to be turned towards the housing part, but is located, for example, more or less away from the housing part.

Further more, the connection of the first subsection of the blocking element to the gas generator carrier can comprise a reinforcement (for example, in the form of a thickening of the gas generator carrier or of a reinforcement material), in order to prevent that the blocking element upon exertion of a tensile force on the latching element opposite the insertion direction, i.e. under the exertion of a pressure on the second section of the blocking element against the insertion direction, mainly bends away from the gas generator carrier in the region of the connection to the gas generator carrier. In particular, the connection between the first subsection of the blocking element and the gas generator carrier is so stable that the second subsection, when a pressure is exerted on the second subsection (via the latching element) against the insertion direction, bends away from the first subsection mainly or exclusively in the region of the curvature.

According to another exemplary embodiment of the invention, the blocking element is integrally formed with the gas generator carrier. In particular, the gas generator carrier is a plastic part to which the blocking element is moulded. For example, the gas generator carrier and the blocking element are fabricated by injection moulding.

According to another exemplary embodiment of the invention, the latching element comprises a latching portion in the form of a protrusion which in latching position of the latching element is located on a side of the gas generator carrier that faces away from the housing part and that, for example, bears against the blocking element. Exemplarily, the latching element in latching position reaches through the latching opening in the gas generator carrier with a first section, wherein the first section extends essentially perpendicular to the gas generator carrier. At an ending of this first section, which reaching through the latching opening, a second section is arranged forming the protrusion, wherein the protrusion protrudes from the first section of the latching element along the gas generator carrier (with respect to the locked state).

The protrusion with an upper side, i.e. a side facing opposite the insertion direction, forms a bearing surface which (with respect to the latching position of the latching element) extends at least approximately parallel to the main extension plane of the gas generator carrier. Subsequently, the bearing surface of the protrusion during an attempt to pull the latching element out of the latching opening will be pressed against the blocking element, in particular against its front side, which e.g. also at least approximately extends parallel to the main extension plane of the gas generator carrier.

For example, the front side (bearing surface) of the blocking element, against which the latching element in latching position bears against or against which it will be pressed when a tensile force is exerted on the latching element, extends inclined to the main extension direction of the blocking element and parallel to the main extension plane of the gas generator carrier, respectively. In other words, the blocking element (or the portion of the blocking element that forms the bearing surface) can run inclined to the gas generator carrier, wherein, however, the bearing surface, which is formed at an ending of the blocking element, extends parallel to the gas generator carrier and thus, in particular, parallel to a bearing surface of the latching element.

The latching opening according to another exemplary embodiment of the invention comprises an at least approximately rectangular cross section, wherein it is referred to the cross section which extends in the main extension plane of the gas generator carrier. It is, of course, also conceivable that latching openings having another geometry are provided. Furthermore, it is, of course, also possible that multiple latching openings having different geometries and multiple latching elements configured accordingly are used.

BRIEF DESCRIPTION OF THE DRAWINGS

The invention will be discussed in more detail in the following by means of embodiments with reference to the Figures.

FIG. 2A shows a sectional view of a part of the airbag arrangement according to an embodiment of the invention before the assembly of the housing part and the gas generator carrier.

FIG. 2B shows the gas generator arrangement of FIG. 2A in perspective view.

FIG. 3A shows a sectional view of the gas generator arrangement of FIG. 2A in the locked state.

FIG. 3B shows a detail of FIG. 3A.

DETAILED DESCRIPTION

Figure 1A:
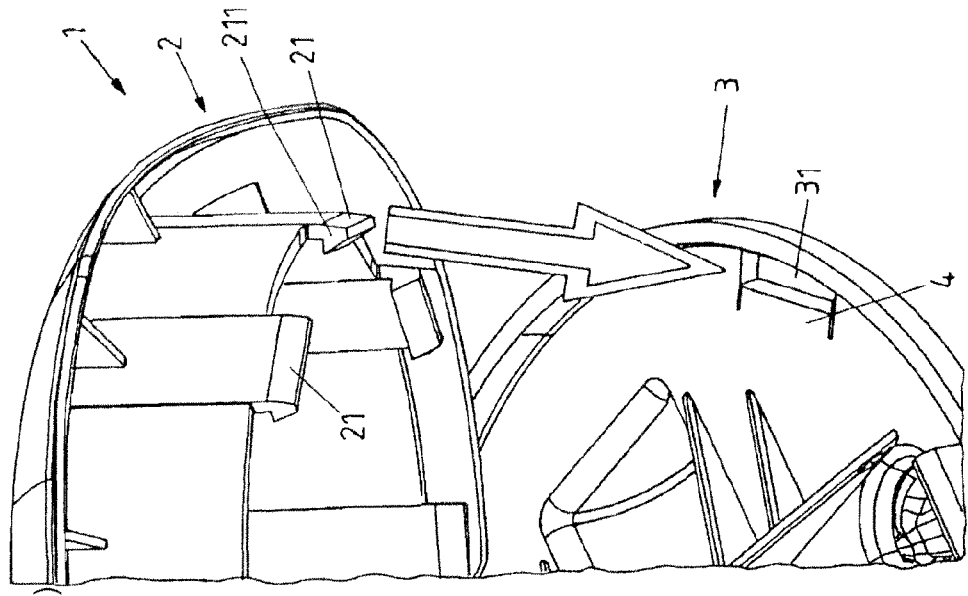
FIG. 1A shows a perspective view of an example of an airbag arrangement which does not form part of the invention.

According to FIG. 1A, an airbag arrangement 1 comprises a housing part in the form of an airbag cap 2 configured to cover an airbag (not shown). The airbag arrangement furthermore comprises a gas generator carrier 3 configured for receiving a gas generator (not shown). The airbag cap 2 will be connected to a gas generator carrier 3 after arranging the gas generator and the airbag.

For connecting the airbag cap 2 to the gas generator carrier 3 the airbag cap 2 comprises a plurality of latching elements 21 which are inserted into corresponding latching openings 31 of the gas generator carrier 3. The latching elements 21, in turn, comprise a latching portion 211 formed as a protrusion, the latching portion protruding from a vertical section 25 of the latching element 21 extending essentially along the insertion direction (i.e. perpendicular to the gas generator 3) and reaching through the latching opening 31 in latching position. After complete insertion of the latching elements 21 in the respective latching opening 31, in each case the protrusion 211 engages behind a blocking element 4 which is integrally formed with the gas generator carrier 3 and which forms a section of the rim of the latching opening 31.

The latching elements 21 are also integrally formed with the airbag cap 2, wherein the latching elements in particular are provided at an inner circumferential partition wall of the airbag cap. The inner partition wall extends in a distance from an outer circumference of the airbag cap and can also be configured to mechanically stabilize the airbag cap.

Figure 1B:
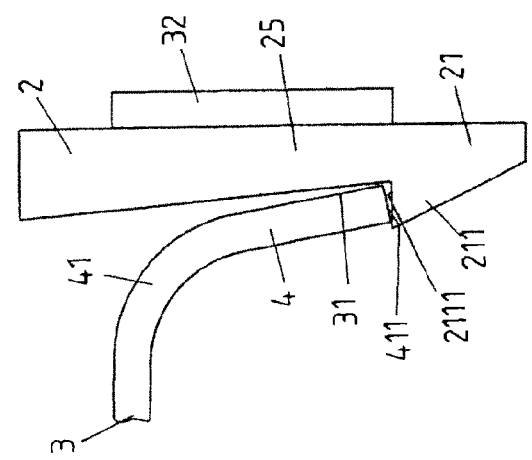
FIG. 1B shows a sectional view of a detail of the airbag arrangement of FIG. 1A.

The blocking element 4 is integrally connected to the gas generator carrier 3 via a curvature 41, wherein because of the curvature 41 it is bent away from the gas generator carrier 3 in such a way that it extends increasingly inclined to the main extension plane of the gas generator carrier 3 and in the latching position of the latching element shown in FIG. 1B bears against a bearing surface 2111 of protrusion 211 of the latching element 21 with a front side 411 when it is attempted to pull the latching element 21 out of the latching opening 31 against the insertion direction.

The blocking element 4 furthermore is elastically connected to the gas generator 3 via the curvature 41 in such a way that it bends away from the opposite rim of the latching opening 31 during the insertion of the latching element 21 in the latching opening 31 and thus enlarges the diameter of the latching opening 31 such that the protrusion 211 of the latching element 21 can be fed through the latching opening 31. After having fed through the protrusion 211 the blocking element 4 snaps back towards the latching element 21 (e.g. in its initial position) such that it e.g. bears against the vertical section 25, e.g. extending parallel to the insertion direction, of the latching element 21 or against another section of the airbag cap 2. In particular, the front side 411 and the bearing surface 2111 of the protrusion 211 of the latching element 21 are located at least approximately parallel and opposite to one another. This, however, is not necessary; the front side 411 can also be arranged at an angle relative to the bearing surface of protrusion 211.

Thus, the curvature 41 on the one hand permits to bend away the blocking element during insertion of the latching element 21 in the latching opening 31 and on the other hand the blocking element 4 is orientated via the curvature 41 in such a way that, when a tensile force is exerted on the latching element 21 against the insertion direction, it moves in a direction perpendicular to the insertion direction towards the latching element 21 (in particular its vertical section) or another section of the airbag cap 2 until it presses against the latching element 21 or the section of the airbag cap 2 so that further (pivot) movement of the blocking element is prevented. In other words, the blocking element 4 is bent away around a pivot point in the region of the curvature 41 against the insertion direction when a tensile force is exerted on the latching element 21 until it rests on the vertical section of the latching element.

In particular, because the latching element 21 is supported by a rim portion 32 of the latching opening 31 of the gas generator carrier opposite the blocking element 4 a bending of the blocking element 4 during withdrawal of the latching element 21 is efficiently blocked. In other words, the blocking element 4 is self-locking since an attempt to pull out the latching element 21 from the latching position leads to an increasing blocking of the blocking element.

FIGS. 2A, 2B and 3A, 3B relate to a refined airbag arrangement according to an embodiment of the invention, wherein FIGS. 2A and 2B relate to the unlocked state, whereas FIGS. 3A and 3B illustrate the airbag cap 2 being locked to the gas generator carrier 3. FIGS. 2A, 3A and 3B are sectional views of the airbag arrangement, wherein FIG. 2B is a perspective view of the airbag arrangement.

The covering cap of the embodiment according to the invention corresponds to the carrying cap of FIGS. 1A and 1B. In contrast to FIGS. 1A and 1B, however, the blocking element 4 is designed differently: The blocking element 4 in this case comprises a first subsection 42 and a second subsection 43, wherein the first subsection 42 (e.g. via a curvature 421) is integrally connected to the gas generator carrier 3 and via a curvature 41 to the second subsection 43. In particular, the blocking element 4 also in this embodiment is moulded at the gas generator carrier 3 by means of injection moulding.

In other words, the blocking element 4 at least approximately is designed U-shaped in cross section, wherein the first and the second subsection 42, 43 represent the two arms of the U and the curvature 41 a connection between the two arms. The blocking element 4 is orientated in such a way that the curvature 41 is located on a side (upper side) 33 of the gas generator carrier 3 which is to be turned towards the airbag cap 2, i.e. on a side that in the locked state of the airbag cap 2 and the gas generator carrier 3 faces towards the airbag cap 2. The blocking element 4 is formed flap-like, i.e. it comprises a longitudinal extension (parallel to the gas generator carrier) orientated perpendicular to the U-shaped base area.

Subsequently, according to the embodiment shown in FIGS. 2A, 2B and 3A, 3B the blocking element 4 protrudes as a bulged portion from an essentially planar side of the gas generator carrier 3 facing towards the airbag cap 2 (the housing part) towards the airbag cap 2.

The latching elements 21 of the airbag cap 2, as already mentioned, are designed analogously to the latching elements 21 of FIGS. 1A and 1B, i.e. they comprise a vertical section 25 which in latching position reaches through the latching opening 31 of the gas generator carrier 3, wherein a protrusion 211 having a bearing surface 2111 and engaging behind the blocking element 4 protrudes from section 25. Because the second subsection 43 is connected to the first subsection 42 via the curvature 41, the second subsection 43 has a certain flexibility such that when the latching element 21 is inserted into the latching opening 31 in insertion direction A the protrusion 211 presses against a surface of the second subsection 43 facing away from the first subsection 42. Thus, the second subsection 43 is moved towards the first subsection 42 such that the dimensions (the width of the essentially rectangular) latching opening 31 enlarge and the protrusion 211 of the latching element 21 can be fed through the latching opening 31. For example, the distance b between the curvature 41 and the front edge of the second subsection 43, which limits the rim portion of the latching opening 31, is at least 1.5 times the width a of the second section 43 (measured perpendicular to its longitudinal extension, i.e. perpendicular to the insertion direction A).

If the latching element 21 reaches its latching position, the second subsection 43 snaps back such that a front side 4221 of the second subsection 43—viewed against the insertion direction A—is located above the bearing surface 2111 of protrusion 211 of the latching element 21. The front side 4221 of the second subsection 43 forms a bearing surface that is in contact or gets in contact when a tensile force is exerted on the latching element with the bearing surface 2111 of protrusion 211 of the latching element.

Further more, the second subsection 43 is orientated in such a way that, when the latching element 21 is in its latching position, it extends slightly inclined relative to the insertion direction A so that its ending connected to the first subsection 42 via the curvature 41 has a larger distance to the locked latching element 21 that its ending (forming the front side 4221) that faces away from the curvature 41. Therefore, the second subsection 43 experiences a deflection (in particular around a pivot point positioned in the region of the curvature 41) towards the vertical section of the latching element 21 or another section of the airbag cap 2 (see FIG. 3B), when a tensile force in a direction B opposite the insertion direction A is exerted on the latching element 21. The deflection of the second subsection 43 is indicated by arrow "C" in FIG. 3B.

The vertical section of the latching element 21 thus blocks a further bending of the second subsection 43 which is assisted by the fact that the vertical section of the latching element is supported by a rim section of the latching opening 31 opposite the second subsection 43 of the blocking element 4. It is also possible that the second subsection 43 of the blocking element 4 in the latching position of the latching element 21 already presses against the vertical section of the latching element 21 reaching through the latching opening 31 such that during an attempt to pull the latching element 21 out of the latching opening 31 a further pivot movement of the second subsection 43 towards the latching element 21 is not possible anymore. The blocking element, i.e. the second subsection 43, nevertheless, experiences a force component towards the vertical section of latching element 21 such that it will increasingly press against the section of the latching element 21 reaching through the latching opening 31.

The at least essentially rectangular front side 4221 of the second section 43 of the blocking element 4 in the initial position, i.e. before locking the airbag cap to the gas generator carrier, extends essentially parallel to the gas generator carrier although the second section itself, as mentioned above, is orientated inclined to the gas generator carrier. According to an example, the front side 4221 even at least approximately is located in a plane together with a section of a lower side of the gas generator carrier 3 facing away from the upper side 33 and adjacent the blocking element 4. In such an example, thus, the end of the second, inclined subsection 43 can be aligned with the (lower) side of the gas generator carrier 3 facing away from the airbag cap 2 or the ending is located in the main extension plane of the gas generator carrier 3 on the (lower) side of the gas generator carrier 3 facing away from the airbag cap 2.

For example, the front side 4221 comprises a surface (bearing surface) of about 280 mm$^2$ against which the bearing surface of the protrusion 211 of the latching element 21 presses. The bearing surface is of great importance for the stability of the latching connection. Accordingly, the stability can be increased by arranging a plurality of latching elements.

The gas generator carrier 3 of the embodiment of FIGS. 2A, 2B and 3A, 3B comprises a plurality of latching openings 31 that are arranged along an outer circumference, which is essentially circularly shaped, wherein the distance between adjacent latching openings 31 is at least partially constant.

Figure 4A:
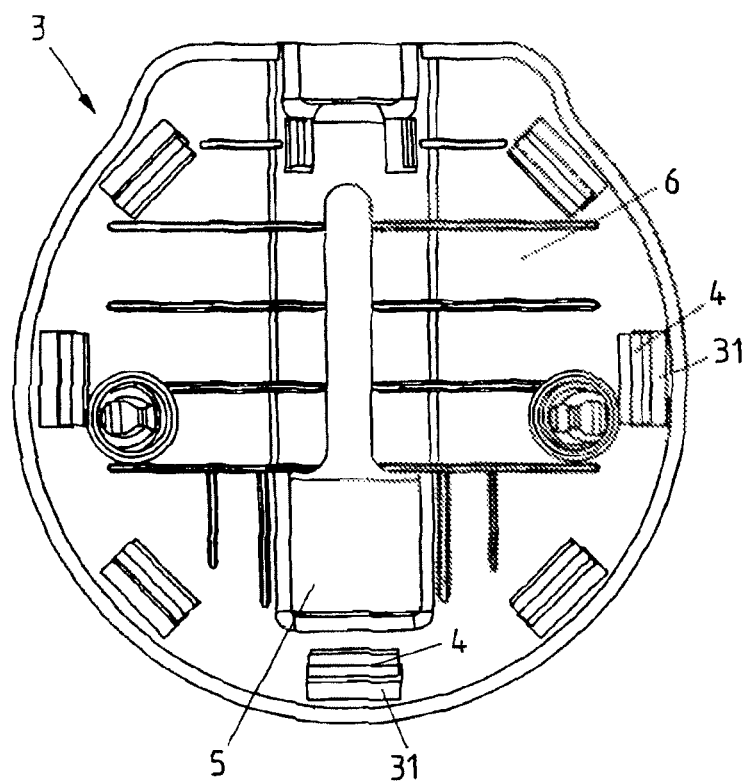
FIG. 4A shows a top view of a gas generator carrier of an airbag arrangement according to the invention
Figure 4B:
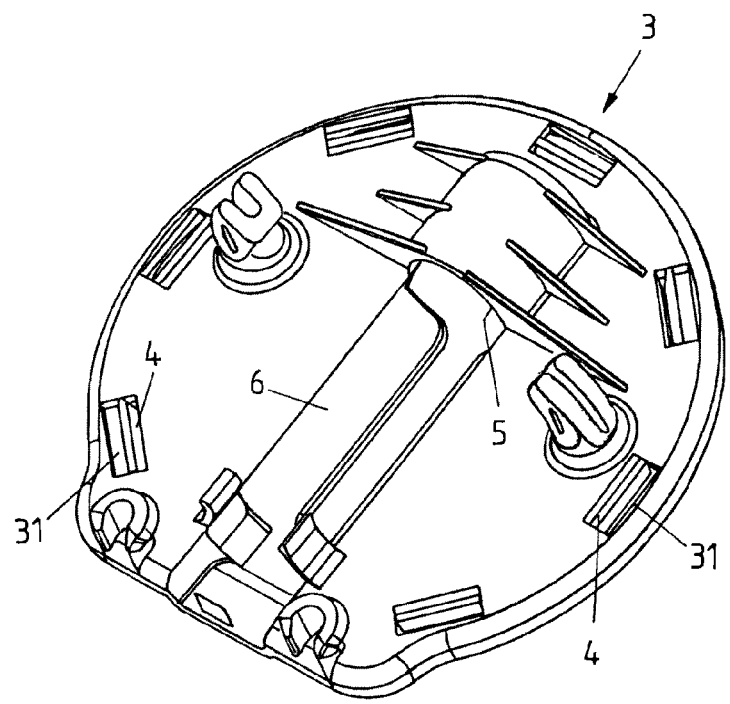
FIG. 4B shows the gas generator carrier of FIG. 4A in perspective view.

Further more, the gas generator carrier 3 comprises a recess 5 to which a bulge 6 is joined. The recess 5 and the bulge 6 realize a receptacle for a tube-like gas generator (not shown) at the gas generator carrier 3. The receptacle for the tube gas generator formed by the recess 5 and the bulge 6 is in particular also shown in FIGS. 4A and 4B which illustrate the gas generator carrier 3 of the embodiment of FIGS. 2A, 2B and 3A, 3B, only.

It is noted that elements of the described embodiments can, of course, also be used in combination. For example, blocking elements according to the embodiments of FIGS. 1A and 1B as well as blocking elements according to the embodiments of FIGS. 2A, 2B and 3A, 3B can be arranged at the gas generator carrier.

The priority application, German Patent Application Number 10 2010 029 087.4, filed May 18, 2010 is incorporated by reference herein.

The invention claimed is:

1. An airbag arrangement for a vehicle occupant restraint system, comprising
an airbag inflatable for protecting a vehicle occupant;
a gas generator for inflating the airbag;
a gas generator carrier at which the gas generator is arranged;
a housing part which—with regard to the state of the airbag arrangement installed in the vehicle—covers the airbag towards the vehicle interior, wherein
the housing part comprises at least one latching element and the gas generator carrier comprises at least one latching opening assigned to the latching element,
the housing part can be connected to the gas generator carrier by inserting the latching element into the latching opening along an insertion direction up to a latching position, where the latching element reaches behind a blocking element adjacent the latching opening and connected to the gas generator carrier such that pulling the latching element out of the latching opening is counteracted,
the blocking element is configured in such a way that it at least in sections presses against the latching element in a direction running obliquely or transversely to the insertion direction when a tensile force opposite the insertion direction is exerted on the latching element in latching position,
the blocking element comprises a first and a second subsection, wherein the first subsection is connected to the gas generator carrier and via a curvature to the second subsection such that the blocking element is designed at least approximately U- or V-shaped in cross section,
the curvature is located on a side of the gas generator carrier that is to be turned towards the housing part, and
the blocking element is located inward of an inner surface of the latching element.

2. The airbag arrangement according to claim 1, wherein the blocking element at least in sections extends at an angle to the gas generator carrier.

3. The airbag arrangement according to claim 1, wherein the blocking element is designed at least approximately U-shaped in cross section, wherein the first and the second subsection of the two arms of the U and the curvature represents the connection between the two arms.

4. The airbag arrangement according to claim 1, wherein the blocking element and the latching element realize a self-locking locking connection of the housing part to the gas generator carrier.

5. The airbag arrangement according to claim 1, wherein the second subsection is orientated in such a way that, when the latching element is in its latching position, it extends slightly inclined relative to the insertion direction such that its ending connected to the first subsection via the curvature has a greater distance to the locked latching element than its ending which faces away from the curvature.

6. The airbag arrangement according to claim 1, wherein the front side of the second subsection is positioned in such a way that it is aligned with a side of the gas generator carrier which is to be turned towards the housing part and/or at least approximately is arranged in a plane with this side of the gas generator carrier.

7. The airbag arrangement according to claim 1, wherein the blocking element at least with a subsection extends obliquely to the gas generator carrier and that the bearing surface of the blocking element, against which the latching element bears in latching position or against which it is pressed when a tensile force is exerted on the latching element, extends parallel to the gas generator carrier.

8. The airbag arrangement according to claim 1, wherein the latching element in latching position bears against a front side of the second subsection which extends at least approximately parallel to the gas generator carrier.

9. The airbag arrangement according to claim 1, wherein the blocking element is integrally connected to the gas generator carrier.

10. The airbag arrangement according to claim 9, wherein the gas generator carrier is a plastic part at which the blocking element is moulded.

11. The airbag arrangement according to claim 1, wherein the latching element comprises a protrusion which in latching position bears against the blocking element.

12. The airbag arrangement according to claim 1, wherein the latching opening comprises an at least essentially rectangular cross section.

13. The airbag arrangement according to claim 1, wherein a surface of the blocking element extending inclined to the gas generator carrier limits the latching opening.

14. The airbag arrangement according to claim 1, wherein the blocking element comprises a bearing surface, against which the latching element bears in latching position, wherein the bearing surface extends inclined to the main extension direction of the blocking element and/or parallel to the main extension plane of the gas generator carrier.

* * * * *